(12) United States Patent
Olsen

(10) Patent No.: US 7,870,116 B2
(45) Date of Patent: Jan. 11, 2011

(54) METHOD FOR ADMINISTRATING DATA STORAGE IN AN INFORMATION SEARCH AND RETRIEVAL SYSTEM

(75) Inventor: Øystein Haug Olsen, Oslo (NO)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 12/068,208

(22) Filed: Feb. 4, 2008

(65) Prior Publication Data

US 2009/0043740 A1 Feb. 12, 2009

(30) Foreign Application Priority Data

Feb. 8, 2007 (NO) .................................. 20070765

(51) Int. Cl.
*G06F 17/30* (2006.01)

(52) U.S. Cl. ...................... 707/705; 707/706; 707/758; 707/769; 707/770

(58) Field of Classification Search .................. 707/705, 707/706, 758, 769, 770
See application file for complete search history.

(56) References Cited

U.S. PATENT DOCUMENTS

| 6,779,058 | B2 * | 8/2004 | Kishi et al. ................. 710/60 |
| 6,973,549 | B1 * | 12/2005 | Testardi ...................... 711/150 |
| 6,986,015 | B2 * | 1/2006 | Testardi ...................... 711/202 |
| 7,013,379 | B1 * | 3/2006 | Testardi ...................... 711/206 |
| 7,096,338 | B2 * | 8/2006 | Takahashi et al. ........... 711/165 |
| 7,143,235 | B1 * | 11/2006 | Watanabe et al. ........... 711/114 |
| 7,173,929 | B1 * | 2/2007 | Testardi ...................... 370/355 |
| 7,424,585 | B2 * | 9/2008 | Takahashi et al. ........... 711/165 |
| 7,593,948 | B2 * | 9/2009 | Suggs et al. ................... 1/1 |
| 7,627,699 | B1 * | 12/2009 | Arumugham et al. ......... 710/31 |
| 2002/0129216 | A1 | 9/2002 | Collins |
| 2003/0014568 | A1 * | 1/2003 | Kishi et al. ................... 710/4 |
| 2004/0250033 | A1 | 12/2004 | Prahlad |
| 2005/0114624 | A1 | 5/2005 | Cervantes |
| 2006/0167930 | A1 | 7/2006 | Witwer |
| 2006/0265358 | A1 | 11/2006 | Hara |
| 2007/0022138 | A1 | 1/2007 | Erasani |

FOREIGN PATENT DOCUMENTS

WO WO 2008/097097 A1 8/2008

OTHER PUBLICATIONS

Hansen et al.; "Using Idle Disks in a Cluster as a High-Performance Storage System" Copyright 2002, 12 pages.
Written Opinion of International Searching Authority in PCT/N02008/000035 dated Feb. 4, 2008, 5 pages.

* cited by examiner

*Primary Examiner*—Jean M Corrielus
(74) *Attorney, Agent, or Firm*—Merchant & Gould P.C.

(57) ABSTRACT

In a method for administrating data storage in an information search and retrieval system, particularly in an enterprise search system, wherein the system implements indexing and search applications and comprises a suitable search engine, and data storage devices and a data communication system which together realize a network storage system provided with an application interface, the network storage system divided in distinct logical volumes which are associated with the physical data storage units and configured depending on the application in one of a read-write mode mounted on one computer, a read-only mode mounted on one or more computers, or a floating and unmounted mode.

17 Claims, 7 Drawing Sheets

Figure 1A:
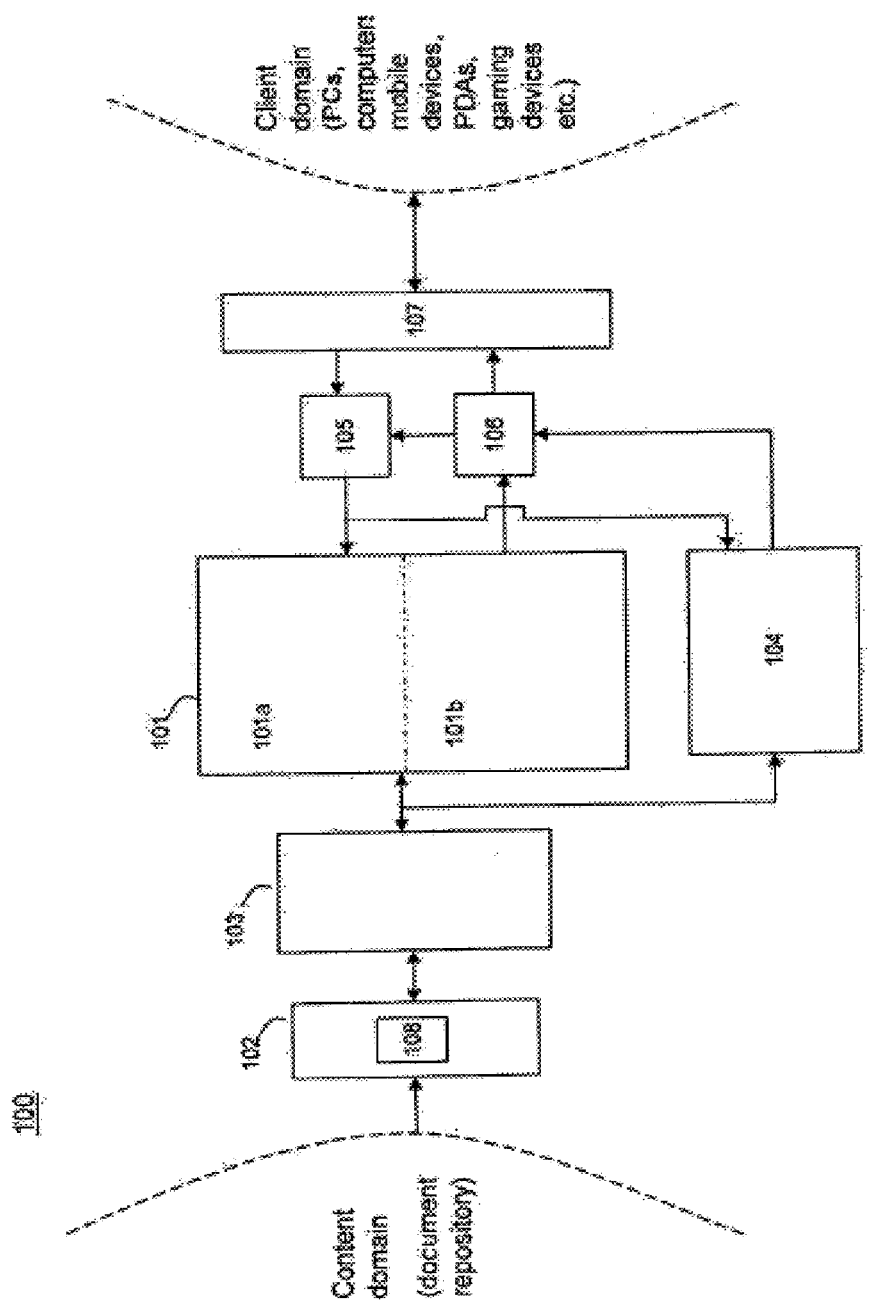

METHOD FOR ADMINISTRATING DATA STORAGE IN AN INFORMATION SEARCH AND RETRIEVAL SYSTEM

The present invention concerns a method for administrating data storage in an information search and retrieval system, particularly in an enterprise search system, wherein the system implements applications for indexing and searching information from objects in content repositories, wherein the system comprises a search engine provided on a plurality of computers, wherein the applications are distributed over said plurality of computers and a plurality of data storage devices thereof, wherein the computers are connected in a data communication system implemented on intranets or extranets, wherein the data storage devices and a data communication network realize a network storage system provided with an application interface, and wherein the network storage system is divided in a plurality of distinct logical volumes, each logical volume being associated with one or more physical data storage units.

The method thus relates to a data storage in connection with the use of a search engine for information search and retrieval. A search engine as known in the art shall now be briefly discussed with reference to FIG. 1a.

A search engine 100 of the present invention shall as known in the art comprise various subsystems 101-107. The search engine can access document or content repositories located in a content domain or space wherefrom content can either actively be pushed into the search engine, or via a data connector be pulled into the search engine. Typical repositories include databases, sources made available via ETL (Extract-Transform-Load) tools such as Informatica, any XML formatted repository, files from file servers, files from web servers, document management systems, content management systems, email systems, communication systems, collaboration systems, and rich media such as audio, images and video. The retrieved documents are submitted to the search engine 100 via a content API (Application Programming Interface) 102. Subsequently, documents are analyzed in a content analysis stage 103, also termed a content preprocessing subsystem, in order to prepare the content for improved search and discovery operations. Typically, the output of this stage is an XML representation of the input document. The output of the content analysis is used to feed the core search engine 101. The core search engine 101 can typically be deployed across a farm of servers in a distributed manner in order to allow for large sets of documents and high query loads to be processed. The core search engine 101 can accept user requests and produce lists of matching documents. The document ordering is usually determined according to a relevance model that measures the likely importance of a given document relative to the query. In addition, the core search engine 103 can produce additional metadata about the result set, e.g. summary information for document attributes. The core search engine 101 in itself comprises further subsystems, namely an indexing subsystem 101a for crawling and indexing content documents and a search subsystem 101b for carrying out search and retrieval proper. Alternatively, the output of the content analysis stage 103 can be fed into an optional alert engine 104. The alert engine 104 will have stored a set of queries and can determine which queries that would have accepted the given document input. A search engine can be accessed from many different clients or applications which typically can be mobile and computer-based client applications. Other clients include PDAs and game devices. These clients, located in a client space or domain, will submit requests to a search engine query or client API 107. The search engine 100 will typically possess a further subsystem in the form of a query analysis stage 105 to analyze and refine the query in order to construct a derived query that can extract more meaningful information. Finally, the output from the core search engine 103 may be further analyzed in another subsystem, namely a result analysis stage 106 in order to produce information or visualizations that are used by the clients.—Both stages 105 and 106 are connected between the core search engine 101 and the client API 107, and in case the alert engine 104 is present, it is connected in parallel to the core search engine 101 and between the content analysis stage 103 and the query and result analysis stages 105; 106.

As mentioned, the search engine, particularly applied as an enterprise search engine in an enterprise search and information retrieval system, is implemented on a plurality of computers, commonly provided as farm of servers in the distributed manner. A well-known prior art server-based system architecture supporting for instance a common enterprise search engine is shown in FIG. 1b. An Ethernet network 111 interconnects servers 112, the servers 112 comprise one or more CPUs 113 and one or more local disk drives 114 connected to the CPUs 113 via local interconnects like SCSI (Small Computer system Interface) or IDE (Integrated Drive Electronics). The disk drives may be arranged as a redundant array of independent/inexpensive disks (RAID). The simplest RAID configuration combines multiple disk drives into a single logical unit.

Figure 2:
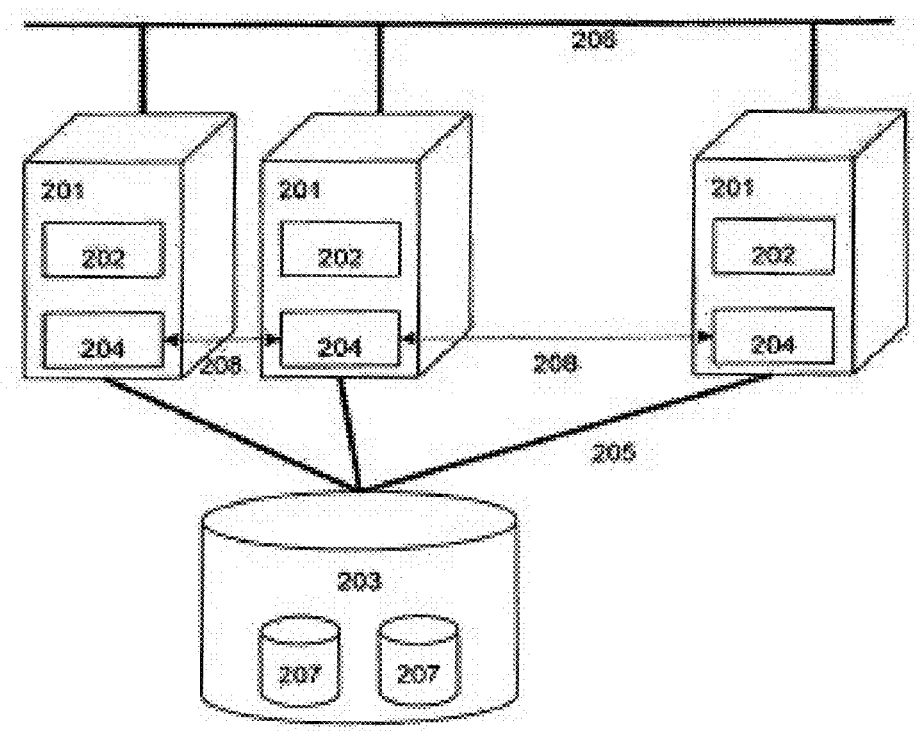

FIG. 2 shows a more recent system architecture for supporting an enterprise search engine. This system architecture is based on a network storage system. The servers 201 are interconnected by Ethernet 206. The servers 201 comprise CPUs 202 which access data on one or more global storage systems 203 via data communication network 205. Frequently accessed data on a storage system 203 are cached in local server caches 204 in order to improve performance. The storage system 203 comprises a plurality of storage units 207, in the form of disk drives so that the storage system 203 can be scaled for volume, performance and fault tolerance independent of the search engine processing system which involves the servers 201. Centralizing the storage system simplifies the administration of physical co-localized storage devices. Network storage systems also offer high reliability and performance as dedicated hardware is used for operating them. Data management services like back-up solutions, rapid disaster recovery, replication, monitoring, and remote management can be closely integrated within the storage system.

The CPUs 202 require a consistent view of the storage state. Disabling local caches 204 provide unsatisfactory performance as the storage input-output becomes a bottleneck. Cluster file systems provide cache coherence by using a network protocol over an interconnection 208 to synchronize the caches 204. The extra network traffic to synchronize the caches 204 yields a somewhat lower performance than a raw access to the storage devices themselves and adds substantial financial costs in terms of initial purchase, administration, documentation and so on. A cluster file system is usually licensed per CPU 202. Huge data volumes can typically be associated with intensive processing requiring a high number of CPUs and thus high license costs for the cluster file system.

Although cluster file systems allow solving general problems related to administrating data storage systems, they also introduce undesired complexities and costs.

Hence a primary object of the present invention is to provide a method for administering network storage systems such that the performance, scalability, fault tolerance, security and the administration of the system are improved.

A further object of the present invention is to provide knowledge about storage access patterns of the network storage system such that local storage units within the network storage system can be configured and controlled.

A final object of the present invention is to entirely dispense with the cluster file system and thus reduce the cost, complexity, and maintenance of the overall network storage system.

The above objects as well as further advantages and features are realized with a method according to the invention which is characterized by configuring the logical volumes in one of a read-write mode and mounted on one computer, a read-only mode and mounted on one or more computers, or a floating mode and not mounted on any computer.

In a first advantageous embodiment of the present invention one or more logical volumes are configured by a system administrator prior to an application, such that the application mounts logical volumes either in the read-write mode on one computer or in the read-only mode on one or more computers.

In a second advantageous embodiment according to the present invention one or more logical volumes are configured by an application itself at a runtime thereof, said one or more logical volumes being created as demanded by the application such that a logical volume is mounted in the read-write mode to one computer only, or mounted in the read-only mode to one or more computers.

Further features and advantages shall also be apparent from the remaining appended dependent claims.

Figure 1B:
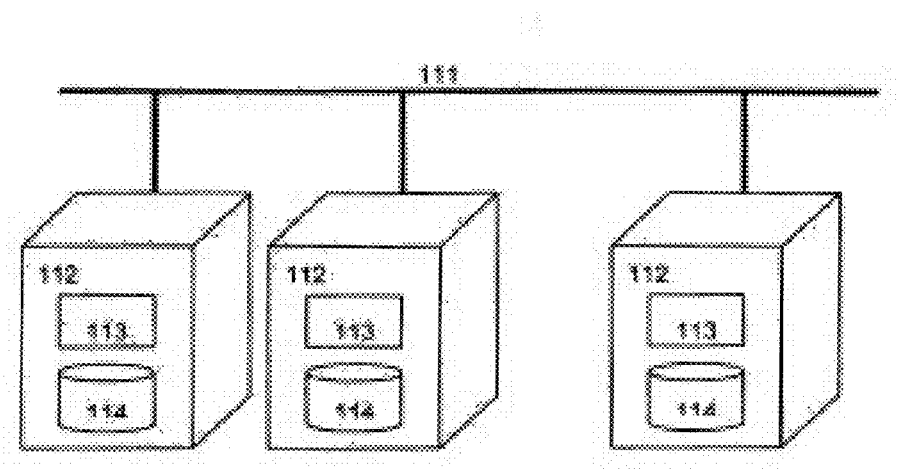
Figure 3:
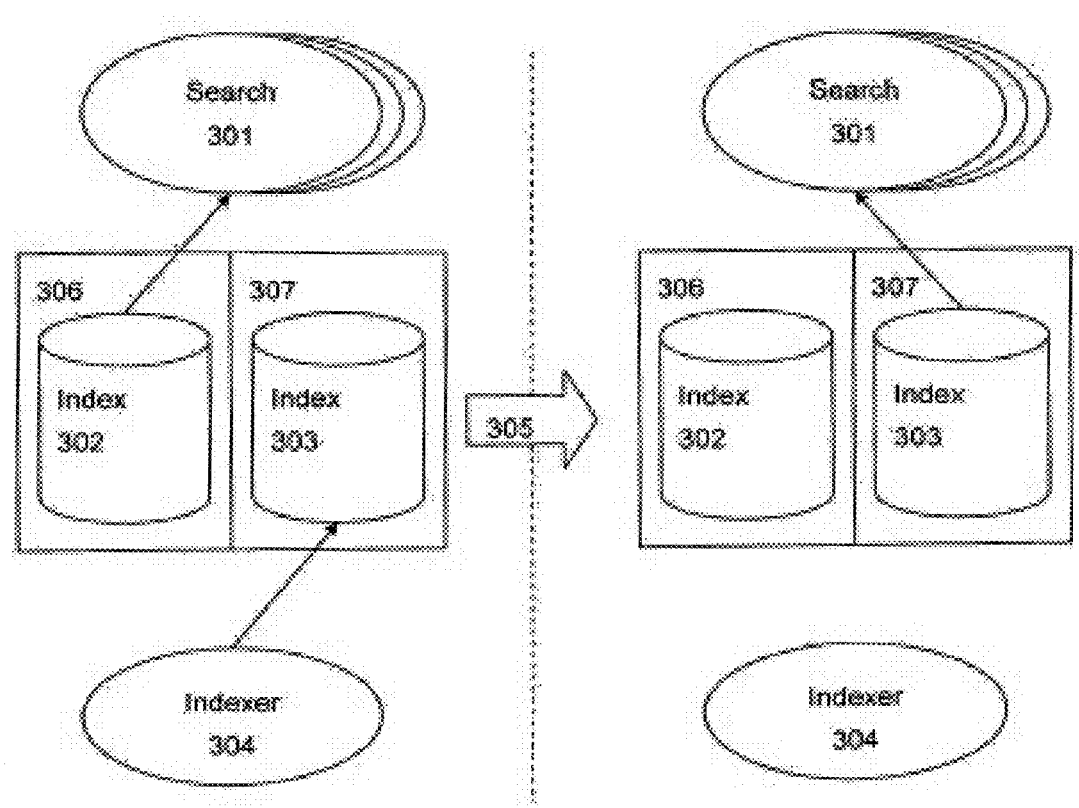
Figure 4:
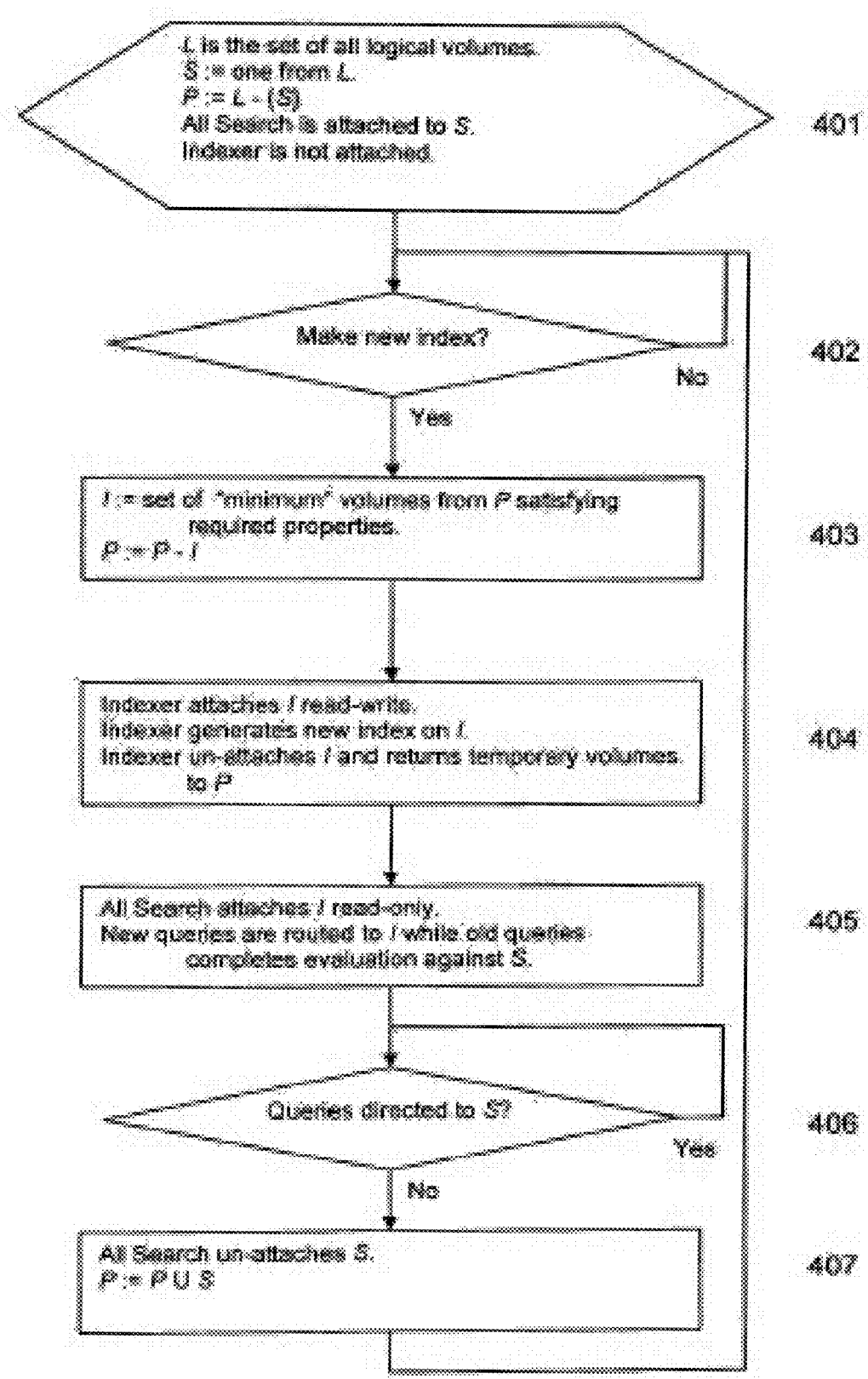
Figure 5:
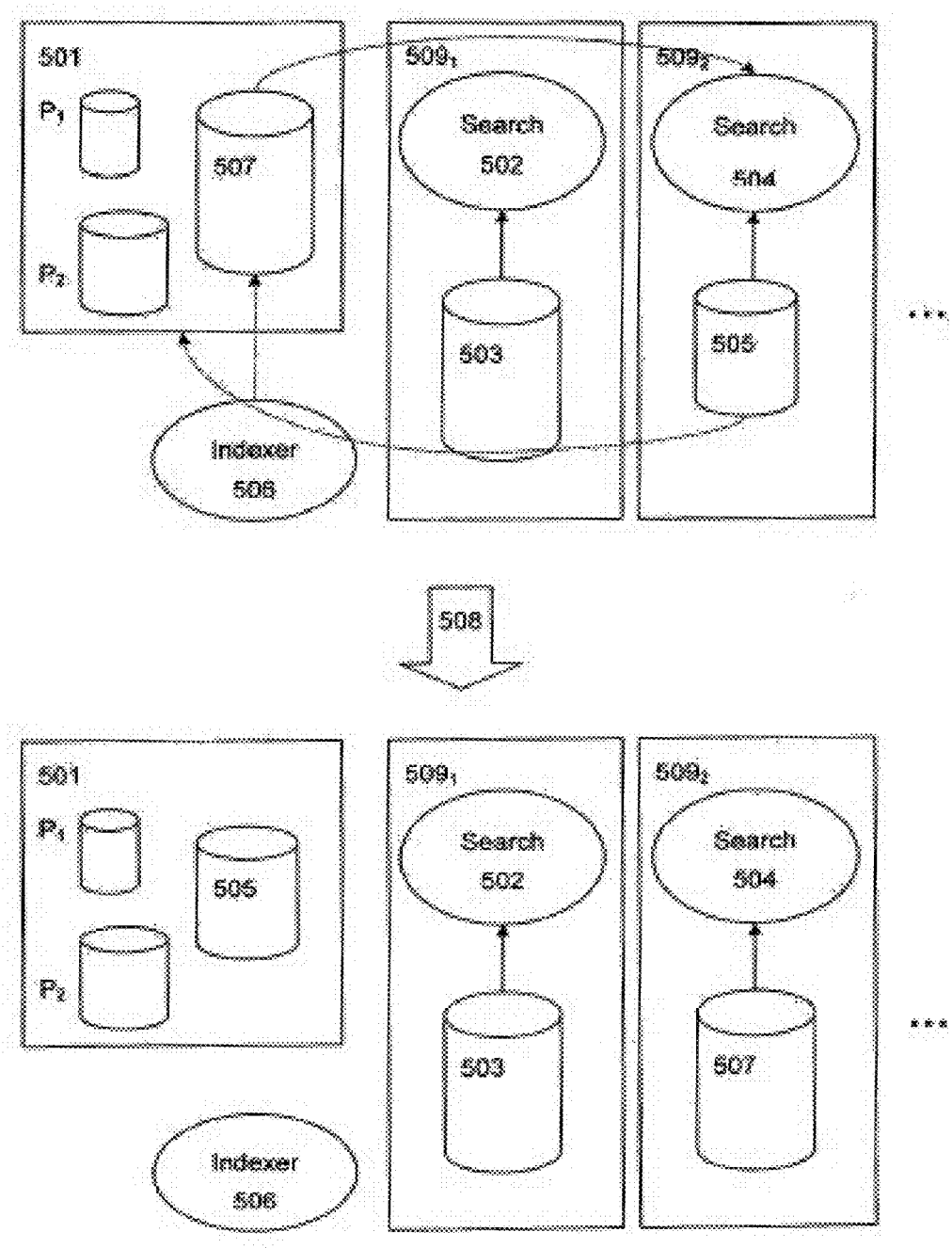
Figure 6:
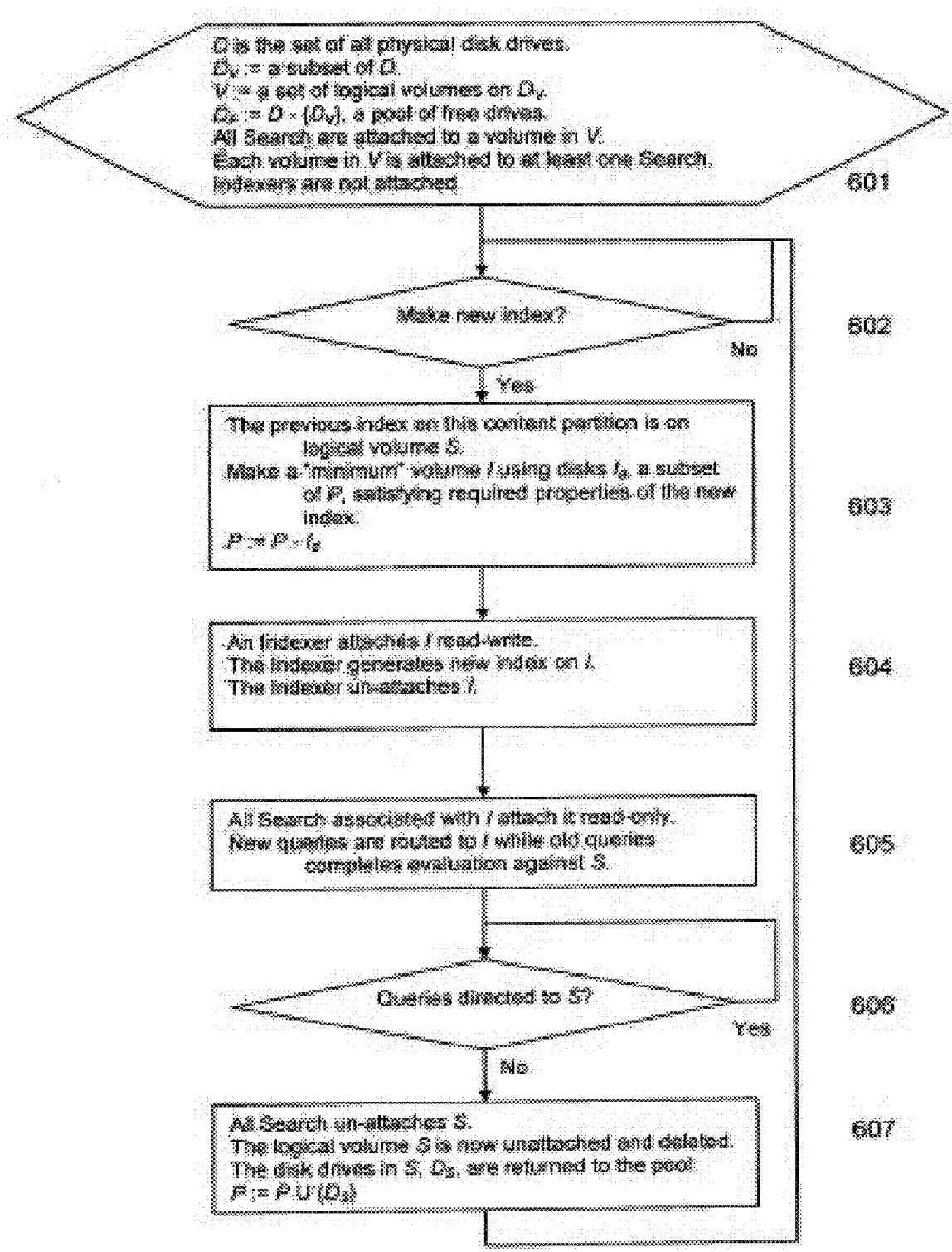
Figure 7:
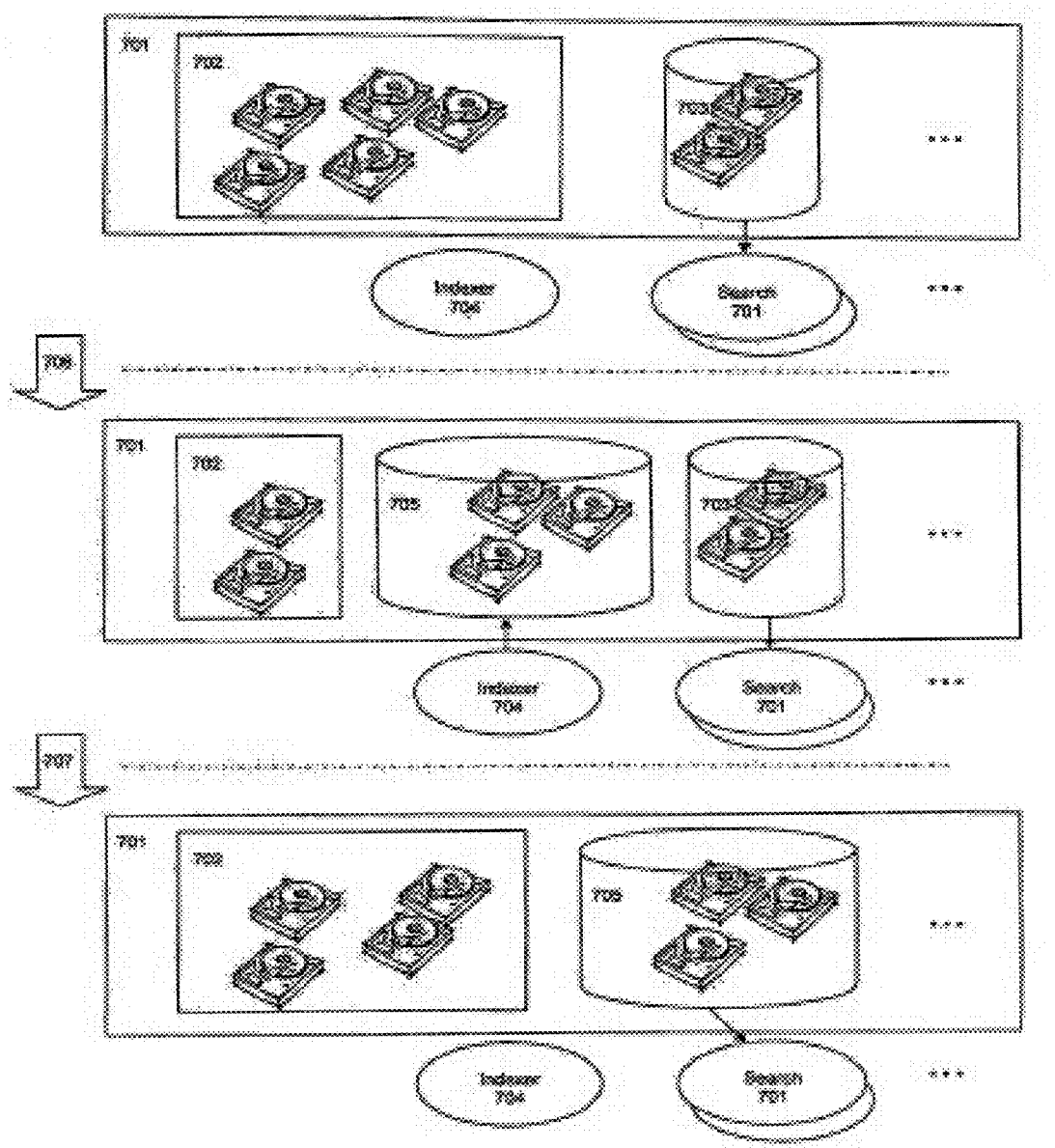

The present invention will better understood from the following discussion of preferred embodiments and read in conjunction with the appended drawing figures, of which FIG. 1a shows a search engine as known in the art and discussed above, FIG. 1b a server system architecture supporting a search engine as known in the art and discussed above, FIG. 2 a server system architecture with network storage as known in the art, FIG. 3 an indexing and search scheme using alternating logical volumes or storage units for an indexing application, FIG. 4 a flow diagram of a first embodiment of the present invention, FIG. 5 an indexing and search scheme according to the first embodiment of the present invention, FIG. 6 a flow diagram of a second embodiment of the present invention, and FIG. 7 an indexing and search scheme according to the second embodiment of the present invention.

Before the method according to the present invention is discussed more thoroughly, network storage systems shall be discussed in some detail, especially with reference to particular exemplary embodiments thereof as known in the art and with particular relevance for enterprise search and information retrieval systems, but not necessarily limited thereto.

One example of a network storage system is called Network-attached Storage (NAS). The servers communicate with a NAS on a file-level protocol via standard Ethernet protocols like Network File System (NFS) and Common Internet File System (CIFS). With reference to FIG. 2 the networks 205 and 206 can be the same physical networks. The NAS protocols offer vague cache coherency for satisfying everyday types of file sharing. For instance, the NFS protocol offers close-to-open cache consistency, supporting the case where a client writes a file to the storage system, closes the file, and then multiple clients open the file for read access.

Another example of a network storage system is called a Storage Area Network (SAN). Here the storage system is divided into logical volumes and each logical volume is individually configured in terms of a number of physical disk drives which may be arranged in a RAID configuration. A server mounts a logical volume and it is made available in the operation system of the search engine as any other local disk. The communication between the servers and the SAN is typically at the block level via a fiber channel protocol (www.fibrechannel.org) on a fiber optical interconnection, but Ethernet and the set of protocols called TCP/IP (Transmission-Control Protocol/Internet Protocol) of which a network protocol standard such as iSCSI (Internet Small Computer System Interface) now is becoming a strong contender. A SAN usually has a low-level disk replication, very large cache memories and strong administration tools.

A straight-forward application of SAN is to mount one or more logical volumes with the cluster file system as the index is continuously updated by the indexer.

An information search and retrieval system typically has to generate one or more large indexes that must be stored in a non-volatile storage. The system periodically makes index snapshots of the content present in the system at that time of the snapshot. A general indexing and search scheme illustrating this is shown in FIG. 3. Here a search application 301 serves queries based on the content of an index 302. At some instant the index application or indexer 304 starts computing a new index 303 based on more recent content that has been added to the system since the last indexing. Once the new index 303 is completed, the system switches its state as indicated by 305 and the search application 301 now starts serving new search queries from the new index 303, while queries already initiated on the old index 302 are completed on that index. When all search queries executed on index 302 are completed, index 302 is released from search application 301 and is available for the index application or indexer 304 to store new indexes. New index computations are initialized on configurable criteria including indexing (publishing) latency, search query throughput, and resource usage.

In a distributed information search and retrieval system comprising computers with local disks, the indexes 302 and 303 are transferred via the system network, e.g. the network 206 as depicted in FIG. 2, to the computer or server hosting the search application 301. Furthermore, the index may have to be transferred to several computers hosting redundant search applications 301 for high availability or higher search query throughput, given a load balancing mechanism across the search application 301.

A network storage system allows the search application 301 and the indexing application 304 to share the same storage. The publishing latency, i.e. the time from content is added to the system and it becomes searchable, decreases as a result of eliminating the need to replicate the indexes 302 and 303 over the system network. The other advantages of network storage systems still apply, e.g. the possibility of adding additional disks for increasing content volume, to achieve higher availability, or higher performance.

As mentioned above, the SAN is applied to mount one or more logical volumes with a cluster file system. As the index is continuously updated by the indexer 304, the cluster file system ensures that the search application 301 have a coherent view of the indexes 302 and 303. The block-level communication of a SAN typically achieves higher search performance than the file-level communication of a NAS as information search and retrieval generally involves random reads to the storage system. Traditionally there has been substantially more overhead per request to a NAS system than in a SAN system.

As should be noted, the present invention applies to network storage systems generally, including both SAN and NAS storage systems. In the former case the present invention shall eliminate the need for cluster file system by controlling logical volumes from the application geared towards the access patterns of information storage and retrieval systems.

In the following the term "document" is used to denote any searchable object, and it could hence be taken to mean for instance a textual document, a database record, table, query, or view in a database, an XML structure, or a multimedia object. Generally the documents shall be thought of as residing in document or content repositories located outside the information search and retrieval system proper, but wherefrom they can be extracted by the search engine of the information search and retrieval system. Further the term "computer" as used in the following is intended to cover the separate servers of a distributed information search and retrieval system. More loosely the term "computer" can be taken as the CPU of the server without detracting from the clarity of the following discussion of the embodiments of the present invention.

The method of the present invention is exemplified by two particularly preferred embodiments. Common to both embodiments is that the application is distributed across multiple computers, such that the problem of how to offer a consistent view of the shared data in the network storage system without overhead in synchronizing low-level accesses must be solved. In the embodiments of the present invention the application synchronizes the data access at application level and thus considerably reduces the overhead. Also common to both embodiments is that the available physical storage within the network storage system is divided into a plurality of distinct logical volumes.

In a first preferred embodiment of the method according to the present invention a number of logical volumes is configured by the system administrator by assigning physical disk drives are assigned to specific logical volumes such that properties such as performance, fault tolerance, backup and recovery are sufficient for the system requirements. The logical volumes are reserved for the application, and the application is made aware of the properties of the logical volumes, either implicitly by inspection via interfaces to the network storage system or explicitly by being declared by the system administrator. Based on the properties of the logical volumes the application can manage the logical volumes in an optimal manner. The application which is distributed on multiple computers in a network, mounts logical volumes either in read-only or read-write mode to specific computers. The application ensures that when a logical volume is read-write mounted to a computer, it is not mounted to any other computer. On the other hand, the logical volume can be mounted read-only to one or more computers. Further, also depending on the number of computers and on-going applications, logical volumes may exist in an unmounted or floating state at any given instant, i.e. they are not connected with any computer. The application uses an interface to the network storage system for mounting logical volumes read-only and read-write to a computer as well as for unmounting logical volumes therefrom.—This first embodiment according to the present invention can be used with both NAS and SAN systems.

In a second embodiment of the method according to the present invention the logical volumes are configured by the application itself, usually at the runtime of the application. The system administrator reserves a set of physical disks in a network storage system for the application. The application has knowledge of the properties of the physical disk and can group disks into logical volumes with desired properties. The application creates logical volumes on demand and uses them according to the same scheme as in the first embodiment discussed above, i.e. a logical volume is either read-write mounted to a single computer or read-only mounted to one or more computers. As before, this implies that depending on the resources at any instant, there can be logical volumes that are unmounted or floating, i.e. not connected with any computer. The application can change the properties of a logical volume; for instance a logical volume may be assembled without data replication to avoid write replication overhead for temporary data during indexing. When the final index is complete, the application adds disks to the logical volumes so that the indexes replicate to offer higher performance. Also, in this embodiment the application uses an interface to the network storage system for the same purposes as the first embodiment, but additionally the interface is also used for assembling, reconfiguring, and dissolving logical volumes.—This second embodiment of the method according to the present invention can particularly be used with SAN systems.

Both the first and second embodiments shall be discussed in greater detail below with reference to the flow diagrams of FIGS. 4 and 6, taken respectively in conjunction with the indexing and search application schemes shown in FIGS. 5 and 7, but before that there shall now be given a detailed exposition of how the documents or the content can be advantageously managed in the method of the present invention.

At top level and as known in the art, the content represented as a set of documents is partitioned in one or more content partitions. The partitioning criteria can include metadata values, including a document identifier, content update patterns, retrieval patterns, and document life-cycle properties. For example, an e-mail archive solution may partition the content on create time per month such that the backup and purging of content on a monthly basis become simple. Documents can be partitioned on frequency of retrieval access such that frequently returned documents are stored in a logical volume with redundant disk supporting high traffic (random read). The most recently added or updated documents may be contained in a small partition that allows low latency content updates by moving unchanged documents into larger partitions after some time. The documents can be partitioned on access permissions so that per-logical volume security mechanisms in the underlying storage system can help guarantee a restricted distribution of content. Some documents are mission-critical while others are not. Documents can be partitioned on importance level such that mission critical documents resides in logical volumes with high availability and fault tolerance, including appropriate backup solutions and replication mechanisms handled effectively within the storage system.

For the purposes of the present invention is possible to partition the information storage system on its components. For example, an information retrieval index contains dictionaries, inverted indexes, and document stores. These are separate components that may be located on separate logical volumes in one or more storage networks and individually partitioned on the criteria given above. Each such component has particular access patterns and life cycle requirements that may be optimized for overall performance, availability, and so on. An inverted index may be further sub-partitioned on the terms of the index. For example, the index may be partitioned such that frequently accessed words are co-located on a logical volume providing high read performance, while the obviously vast volume of infrequently accessed words are located on logical volumes with other characteristics.

The indexing, i.e. the index updating scheme, as illustrated in FIG. 3 can apply to each document partition where each index is associated with a logical partition. At any given time, there is only one write application (indexer) or multiple read applications (search) accessing a particular index. The indexer mounts the unused logical volume in the operating system for read-write access and creates the new index, then unmounts the volume, and allows the search application to mount that logical volume for read-only access. When a new index (on a different logical volume) is ready, the old logical volume is unmounted and made available for subsequent indexing. There is no need to use a cluster file system as there are no cache coherency problems; only the (single) indexer writing to the logical volume is attached while the volume is modified with a new index.

The start of an indexing process or application can be triggered by several factors. The elapsed time since the last index, the number of changed documents, in terms of added, changed, and deleted documents, and the pure data volume of changed content can each or together trigger the generation of a new index within the partition. Each document can carry a priority, either defined explicitly by the client of the system or extracted or computed within the system, which is included and weighed are other factors. The indexing application for large partitions is resource-intensive and may be subject to overall resource constraints for the system, e.g. where the system resides on resources shared with other software systems such as CPU capacity, RAM, and storage and network bandwidth.

As understood from the above, there shall according to the present invention be allocated (at least) two logical volume partitions. At any instant one logical volume is mounted in the read-only state to one or more computers for executing a search application, while the other could be in any of a search or indexing application or left floating unmounted to any computer. This also requires at least a doubling of the effective storage in the system to handle simultaneously occurring peaks in all partitions. In an improved scheme all unused (free; unmounted) logical volumes are pooled across partitions. Each logical volume has some properties, for instance the data capacity, access performance availability (fault-tolerance) properties, backup properties, etc. An indexer acquires a suitable logical volume from the pool of free logical volumes, creates the index, passes it on to the search applications, and the search applications release the logical volume back to the pool when a new index is effective. This scheme reduces the storage space requirements at the cost of not being able to guarantee indexing latency. The indexer may have to wait for an appropriate logical volume to be released. This contention for a suitable free logical volume is another factor that affects the scheduling and triggering of the indexing applications.

The conceptual basis for the method according to the present invention shall be more easily visualized with reference to FIG. 5 which actually discloses the indexing and search application schemes executed in the first embodiment of the present invention.

FIG. 5 shows a pool 501 of free logical volumes $P_1, P_2 \ldots$ where the content is partitioned in two partitions. One partition 509$_1$ is served by a search application 502 using an index on logical volume 503, and the other partition 509$_2$ is served by a search application 504 using an index on the logical volume 505. The indexing application (the indexer) 506 is associated with the partition 509 and is initially idle. The dotted lines show the transition when a new index is triggered, as indicated by 508. The indexer 506 finds a suitable free logical volume 507, generates the new index on that volume, and deploys it on a search application, e.g. 504. The logical volume 505 containing the previous index for the search application 504 is recycled to the pool 501 of free or unmounted logical volumes.

There will be some overhead per logical volume such that the above-discussed method applies more to larger partitions. One or more logical volumes can be reserved for small partitions. These logical volumes could be configured for optimal read/write access, but a cluster file system is still required if there are multiple computers accessing a volume. However, there will be relatively few CPUs associated with the cluster file system on the small partitions, and the license cost will be marginal. The dominant proportion of the CPUs will be handling data in the large partition that resides on logical volumes handled by the application. Using a NAS or local disks for the small partitions would offer a good compromise between performance, purchase cost, and maintenance cost. In configurations where the small partitions are used to improve indexing latency, migrating old documents to larger partitions, there will be few scalability issues for the small partitions.

The present invention also applies to logical volumes associated with local disks, as e.g. used in SAN systems. A network storage system can be configured with multiple logical volumes, each with a specific configuration of disks, e.g. a number of disks in a specific RAID setting. The application mounts these logical volumes into the information search and retrieval system on demand. Alternatively, the logical volumes are pre-mounted, and the application associates the mount location with the physical properties of the underlying logical volume. Either way, the application directs data to and from appropriate logical volumes. The same principles of course apply to NAS systems. The application can control the data flow to and from selected NAS units and selected logical volumes within each NAS unit by knowing the mapping of logical volumes within the file system hierarchy, including the properties of the volumes.

The first embodiment whereby the configuring is performed by the system administrator shall now be discussed in more detail with reference to FIG. 4, which shows a flow diagram for allocating logical volumes in an information search and retrieval system, and the already mentioned FIG. 5, which shows the indexing and search application scheme for this embodiment. In step 401 of the flow diagram the system administrator decides to partition the network storage into a set of logical volumes L exclusively assigned to an information storage and retrieval system. The active indexes as read by search applications 502, 504 are located on subsets of L that are mounted read-only to the match computers hosting the search applications 502, 504. The remaining logical volumes of L is a pool P of free, i.e. unmounted floating logical volumes $P_1, P_2, \ldots$. The indexing application 506 is not attached to any logical volumes. In step 402 the application is required to build a new index 507 and make it searchable, and proceeds to step 403. In step 403 the indexing application picks from the above-mentioned pool P one or more free logical volumes $P_1, P_2, \ldots$ that fulfils the requirements of the new index 507 and possibly also acquires logical volumes for temporary data structures. These logical volumes are, however, returned to the pool P when the new index 507 is complete. In step 404 the acquired logical volumes forming a set I are mounted on the computer hosting the index application or indexer 506. The indexer 506 generates the new index 507 on the acquired logical volumes of the set I. The acquired logical volumes of the set I are unattached from any computer and temporary volumes are removed from pool I and returned to pool P. In step 405 the indexer 506 performs a switching operation 502 and attaches the logical volumes of the set I with the new index 507 to the associated search application, e.g. 504. Search queries already under evaluation/execution are completed on the old index 503 on logical volumes of a set S, while new queries are evaluated against the index volume 507.

In step 406 it is detected that no queries are evaluated/executed against the old index 503, and the indexer 506 proceeds to step 407. In step 407 the logical volumes of the set S are unattached from all computers hosting search applications 502, 504 and returned to the pool of free logical volumes P. The indexer 506 then returns to step 502.

The first embodiment includes a variant wherein one logical volume can be used both for indexing and for searching. A transfer of the logical volume takes place internally when a new index or directory is copied to another physical storage unit take place. The search application unmounts the attached logical volume when the new index is copied thereto, then remounts the logical volume in a read-only mode and the search application continues on the new index after a very short delay, depending on the remounting process.

Now the second embodiment of the present invention shall be discussed in some detail with reference to the flow diagram in FIG. 6 and the indexing and search application scheme shown in FIG. 7. In this embodiment the logical volumes are configured by an application itself, and this application is distributed across several computers that control physical of the network storage systems, for instance disk drives.

In an initial state 601 a set D of disk drives 701 in the network storage system has been allocated to the information storage and retrieval system. The content on which the application is executed is partitioned so that each content partition is exclusively associated with a set of logical volumes (i.e. each logical volume is only associated with one content partition) V. Each logical volume 703 is composed of a set of physical disk drives. The set $D_F$ of the remaining disk drives corresponds to free disk drives 702.

In step 602 the application determines that a new index on a content partition is to be generated as the content is updated and the search query traffic changes. The possible indexes to be generated are prioritized by cost and benefit of generating the new index and are initiated as indicated by 706 in FIG. 7.

In step 603 the indexing application for the index creates a new logical volume 705 of physical disk drives from the pool of free disk drives 702 such that the logical volume has the desired property, e.g. redundancy, throughput, etc.

In step 604 the logical volume 705 is mounted in read-write mode to the computer where the indexer or index application 704 for the associated content partition resides. The indexer 704 generates the new index to the new logical volume 705 and then unmounts this volume as indicated by 707 in FIG. 7.

In step 605 new logical volumes 753 are mounted in the read-only mode to computers running search applications 701 on the content partition. These search applications start using the index for new queries. Queries already under evaluation are completed on the existing index.

In step 606 it is determined that all queries executed on the old index located on the logical volume 703 now have been completed, and the process continues to step 607 wherein the old logical volume with the old index is unmounted from computers with the search application 701 associated with the content partition. The logical volume in question is no longer attached to the search application 701 and is removed from the network storage system. The physical storage units, i.e. disk drives assigned to this volume, are returned to the pool $D_F$ of free disk drives 702 and the embodiment returns to step 602.

In both embodiments according to the present invention indexing snapshots shall commonly be initiated in response to a change in the content volume or data size, but it could also be initiated by change in the number of documents, elapsed time since the last preceding index snapshot, as well as content priorities, available storage and processing and network bandwidth resources. Particularly shall index snapshots within the SAN be triggered by the indexer directly, e.g. upon knowledge of changes in data or content.

Quite generally the physical data storage units can be equated with physical disk drives and then the logical volumes can be located on local disks. In case of a network-attached storage system (NAS) the logical volume shall be located on a plurality on NAS units and then an application shall be aware of the location of the logical volumes in the file system within the NAS units and the properties of the former.

If the logical volumes are located in one or more storage area networks the logical volumes can advantageously be mounted via for instance a storage network API, a storage network web service or callouts to command the line utilities as would be obvious to persons skilled in the art. Copying or copy mechanism can be located within the SAN system such that copying or a replication of data takes place directly from an application initiating a copy mechanism. The initiation can be effected via industry standard interfaces or vendor-specified adapters. For such purpose the copy mechanisms provided could be low-level and proprietary. Persons skilled in the art will easily realize that the most obvious need for a copy mechanism is to enable the replication of data from a logical volume attached to an indexing application and to a logical volume attached to a search application. In this case the indexing application itself of course initiates the copying to the search-attached logical volume, which however then under the data transfer process is briefly unmounted from the search application, which remounts the logical volume in a read-only mode when e.g. a newly created index or directory has been transferred.

The method according to the present invention can advantageously be performed in the manner so as to enhance and improve the storage option in existing storage and information retrieval system. It can also be used to support particular and novel storage options. A few examples of the possibilities offered in an information storage and retrieval system by performing the method of the present invention shall be given below.

EXAMPLE 1

Archiving Information for Retrieval and Access

Legal requirements enforce corporations to archive correspondence, including all e-mail traffic, for a number of years while also allowing efficient access to the information in case there are suspicions of fraud. The system can be optimized for the addition only of content, possibly with infrequent modifications of metadata. Content is deleted after some expiry time. The content is partitioned on the creation time. All new content is passed to a partition working in synchronized read-write mode, e.g. on local disks. As that partition is filled up, a new logical volume is allocated, possibly by expanding the physical storage. The full index is replicated on that volume, and a new search process starts serving the partition while the partition in the incremental-mode is cleared.

EXAMPLE 2

Storing Account Transaction History for Bank Customers

Bank customers may be allowed access to past transactions by search and online budgeting services. The host, i.e. the banks themselves, benefit from transaction data by performing analyses of customer behaviour. Content is addition-only. Erroneous transactions are never changed as new transactions are appended to correct the errors. The same principles as used for archiving information in Example 1 above are applied.

EXAMPLE 3

Access to and Information of Analysis from Logging Services

This is based on the same principles as disclosed in Example 1 above. Information storage and retrieval systems are able to store information from logging services and provide user access thereto and allow the analysis of the relevant information. This includes such information as user interaction logging, data logging from physical processes using RFID (Radio Frequency IDentification) streams, and web archival applications.

EXAMPLE 4

Content Partition on Multimedia Broadcast Streams

If multimedia broadcast streams also are addition-only in nature, they can be captured and refined. The streams are then segmented and the document content can be applied to selected segments such that the content can be partitioned on a suitable criterion, e.g. time.

The invention claimed is:

1. A method for administrating data storage in an information search and retrieval system, the method comprising:
providing a network storage system that comprises a plurality of data storage devices, a data communication network and an application interface, the network storage system divided into a plurality of distinct logical volumes, each of the logical volumes being associated with one or more of the data storage devices,
picking, by an indexing application provided by a first computer, a first logical volume from among a pool of unmounted volumes, the pool of unmounted volumes being ones of the logical volumes that are not mounted by any computer;
after the indexing application picks the first logical volume, mounting, by the first computer, the first logical volume in a read-write mode;
indexing, by the indexing application, objects in a content repository to generate, on the first logical volume, an updated version of an index;
mounting, by a second computer, a second logical volume in a read-only mode, the second computer providing a searching application, the second logical volume being one of the logical volumes, the second logical volume storing an earlier version of the index;
using, by the searching application, the earlier version of the index to search for objects in the content repository;
after the indexing application finishes generating the updated version of the index, unmounting the first logical volume from the first computer;
after the first logical volume is unmounted by the first computer, mounting, by the second computer, the first logical volume in the read-only mode; and
after the second computer mounts the first logical volume, using, by the second computer, the updated version of the index to search for objects in the content repository.

2. The method of claim 1, further comprising:
configuring the logical volumes by a system administrator.
3. The method of claim 1, further comprising:
configuring the logical volumes by an application at a runtime, the logical volumes being created as demanded by the application.
4. The method of claim 1, further comprising:
generating a plurality of partitions by partitioning objects in the content repository based on criteria that are based on document metadata values or information storage components, and
assigning each partition to one or more of the logical volumes.
5. The method of claim 4, further comprising:
configuring the one or more logical volumes within a partition according to one or more system properties of the partition, the one or more system properties including random access read performance by storage unit replication in regard of information and search request and search query traffic on a partition, fault tolerance, security, content update traffic, and maintenance operations and their frequencies.
6. The method of claim 4, further comprising assigning a given partition in the plurality of partitions to two of the logical volumes, one logical volume at any instant being a search volume and the other being one of a free volume, an index volume or a search volume.
7. The method of claim 4, further comprising:
sharing the pool of unmounted logical volumes among two or more of the partitions, and
planning generation of indexes on the basis of prioritized requests and available resources for the indexing application, including free logical volumes and available indexing computers.
8. The method of claim 5, further comprising:
sharing a pool of free storage units among the partitions,
prioritizing requested indexes on the partitions in response to contention for the free storage unit,
planning an indexing based on prioritized requests and available resources for the indexing application, the available resources including free storage units and computers which are able to be run as indexing computers,
assigning one or more storage units in the pool of free storage units to one or more of the logical volumes for indexing by removing the one or more storage units from the pool of free storage units as the indexing application is executed, and releasing the one or more storage units to the pool of free storage units as search volumes are unmounted.
9. The method of claim 8, further comprising:
initiating generation of indexes in response to a change in content volume or data size, a change in a number of documents, elapsed time since last preceding index snapshot, content priorities, and available storage, processing and network bandwidth resources.
10. The method of claim 1, wherein the physical data storage units are physical disk drives.
11. The method of claim 1, wherein the logical volumes are located on local disks.
12. The method of claim 1, further comprising locating the logical volumes on a plurality of network-attached storage (NAS) units.
13. The method of claim 1, further comprising: locating the logical volumes in one or more storage area networks (SANs).

14. The method of claim 13, further comprising: mounting the logical volumes via one of the application interface of the network storage system, storage network web services, or call-outs to command line utilities.

15. The method of claim 13, further comprising: replicating data with an application initiating low-level and proprietary copy mechanisms.

16. The method according to of claim 15, further comprising: replicating data from indexing volumes to search volumes.

17. A method for administrating data storage in a search engine, the method comprising:
- providing a network storage system that comprises a plurality of data storage devices, a data communication network and an application interface, the network storage system divided into a plurality of distinct logical volumes, each of the logical volumes being associated with one or more of the data storage devices;
- configuring the one or more logical volumes within a partition according to one or more system properties of the partition, the one or more system properties including random access read performance by storage unit replication in regard of information and search request and search query traffic on a partition, fault tolerance, security, content update traffic, and maintenance operations and their frequencies;
- generating a plurality of partitions by partitioning objects in a content repository based on criteria that are based on document metadata values or information storage components,
- assigning each partition to one or more of the logical volumes;
- sharing a pool of free storage units among the partitions;
- prioritizing requested indexes on the partitions in response to contention for the free storage units;
- planning an indexing based on prioritized requests and available resources for an indexing application, the available resources including the free storage units and computers which are able to be run as indexing computers;
- assigning one or more storage units in the pool of free storage units to one or more of the logical volumes for indexing by removing the one or more storage units from the pool of free storage units as the indexing application is executed by a first computer, and releasing the one or more storage units to the pool of free storage units as search volumes are unmounted;
- picking, by the indexing application, a first logical volume from among a pool of unmounted volumes, the pool of unmounted volumes being ones of the logical volumes that are not mounted by any computer;
- after the indexing application picks the first logical volume, mounting, by the first computer, the first logical volume in a read-write mode;
- indexing, by the indexing application, objects in the content repository to generate, on the first logical volume, an updated version of an index;
- mounting, by a second computer, a second logical volume in a read-only mode, the second computer providing a searching application, the second logical volume being one of the logical volumes, the second logical volume storing an earlier version of the index;
- using, by the searching application, the earlier version of the index to search for objects in the content repository;
- after the indexing application finishes generating the updated version of the index, unmounting the first logical volume from the first computer;
- after the first logical volume is unmounted by the first computer, mounting, by the second computer, the first logical volume in the read-only mode; and
- after the second computer mounts the first logical volume, using, by the second computer, the updated version of the index to search for objects in the content repository.

* * * * *